US007131002B2

(12) United States Patent
Yoshizawa

(10) Patent No.: US 7,131,002 B2
(45) Date of Patent: Oct. 31, 2006

(54) AUTHENTICATION METHOD, AUTHENTICATION SYSTEM, SEMICONDUCTOR CIRCUIT AND AUTHENTICATION MODULE

(75) Inventor: Masaki Yoshizawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 962 days.

(21) Appl. No.: 09/948,552

(22) Filed: Sep. 10, 2001

(65) Prior Publication Data

US 2002/0032859 A1 Mar. 14, 2002

(30) Foreign Application Priority Data

Sep. 11, 2000 (JP) .......................... P2000-274640

(51) Int. Cl.
*G06F 11/30* (2006.01)

(52) U.S. Cl. ...................... 713/168; 713/185; 713/159; 713/172; 235/380

(58) Field of Classification Search ................ 713/155, 713/161, 184, 185, 168, 169, 200–201; 380/232, 380/2, 201, 28, 247; 235/492, 380; 705/39, 705/57, 67
See application file for complete search history.

(56) References Cited

U.S. PATENT DOCUMENTS 5,208,447 A * 5/1993 Kruse ......................... 235/380
5,799,085 A * 8/1998 Shona ........................ 713/169
5,841,866 A * 11/1998 Bruwer et al. ................ 705/66
6,058,477 A * 5/2000 Kusakabe et al. .......... 713/169
6,076,164 A * 6/2000 Tanaka et al. .............. 713/185
6,148,404 A * 11/2000 Yatsukawa .................. 713/200
6,240,517 B1 * 5/2001 Nishioka .................... 713/201
6,415,370 B1 * 7/2002 Nakajima ................... 711/163
6,659,343 B1 * 12/2003 Tanaka ....................... 235/380
6,724,296 B1 * 4/2004 Hikita et al. ............... 340/5.61
6,745,331 B1 * 6/2004 Silverbrook ................. 726/36
6,810,479 B1 * 10/2004 Barlow et al. .............. 713/185
6,816,968 B1 * 11/2004 Walmsley ................... 713/168
6,879,341 B1 * 4/2005 Silverbrook ............. 348/231.6

OTHER PUBLICATIONS

Dhem et al., "Hardware and Software Symbiosis Helps Smart Card Evolution", IEEE, pp. 14-25.*
Choi et al., "SVM-Based Speaker Verification System for Match-On-Card and its Hardware Implementation", ETRI Journal, vol. 28, No. 3, Jun. 2006.*

* cited by examiner

*Primary Examiner*—Jacques Louis-Jacques
*Assistant Examiner*—Tongoc Tran
(74) *Attorney, Agent, or Firm*—Rader, Fishman & Grauer PLLC; Ronald P. Kananen

(57) ABSTRACT

A method of authentication capable of avoiding an easy copying of a module used for personal authentication of an IC card or the like and thereby raising the reliability of the personal authentication, comprising having an electronic circuit having a hardware configuration corresponding to a predetermined authentication processing provided in an IC of an IC card carry out authentication processing using a PIN and data generated at an authentication apparatus at random and having the authentication apparatus similarly carry out the authentication processing, compare the processing result received from the IC card and the processing result obtained by itself, and, when they coincide, authenticating the user of the IC card as the legitimate user.

24 Claims, 7 Drawing Sheets

AUTHENTICATION METHOD, AUTHENTICATION SYSTEM, SEMICONDUCTOR CIRCUIT AND AUTHENTICATION MODULE

BACKGROUND OF THE INVENTION

1. Field of the Invention

The present invention relates to an authentication method, an authentication system, a semiconductor circuit, and an authentication module.

2. Description of the Related Art

In recent years, electronic commercial transactions accompanied with personal authentication using an integrated circuit (IC) card have spread.

An IC card equipped with such a personal authentication function usually stores authentication software in the IC and carries out a predetermined authentication processing by the authentication software by using for example a personal identification number (PIN) input by a user. The result of the authentication processing is transmitted via a network to an authentication apparatus. The authentication apparatus authenticates the legitimacy of the user of the IC card based on the result of the authentication processing in the authentication apparatus.

An IC (semiconductor circuit) of such an IC card is usually mass produced by photolithography utilizing a circuit mask pattern common for all the other ICs. Therefore, the hardware configuration is the same as the ICs of the other IC cards. Easy illegitimate copying of the IC card is prevented by making part of the processing described in the authentication software different from that of the ICs of other IC cards.

Summarizing the disadvantage to be solved by the invention, in the conventional IC card mentioned above, however, copying of the software is relatively easy, so the authentication software stored in the IC ends up being copied and illegitimate copying of the IC card cannot be sufficiently prevented. For this reason, there is a disadvantage in that illegitimate personal authentication ends up being made by using an illegitimately copied IC card and therefore electronic commercial transactions having a high reliability are not possible.

SUMMARY OF THE INVENTION

An object of the present invention is to provide an authentication method, an authentication system, a semiconductor circuit, and an authentication module capable of avoiding easy copying of a module used for personal authentication of IC card etc. and raising the reliability of personal authentication.

In order to achieve the above object, according to a first aspect of the present invention, there is provided an authentication method for authenticating a legitimacy of a user of a first module by using a portable first module and a second module capable of communicating with the first module, comprising the steps of having an electronic circuit having a hardware configuration corresponding to predetermined authentication processing provided in the first module carry out authentication processing by using first data input to the first module and having the second module carry out the authentication processing by using second data corresponding to the first module and compare a result of the processing of the first module with the result of the processing of the second module to authenticate the legitimacy of the user of the first module.

Preferably, the electronic circuit has a unique hardware configuration.

The authentication method of the present invention preferably authenticates that the result of the processing of the first module and the result of the processing of the second module coincide and the user of the first module is a legitimate person when the first data and the second data coincide.

The authentication method of the present invention alternatively further generates third data by one module between the first module and the second module, transmits the generated third data from the one module to the other module, carries out the authentication processing by using the first data and the third data by the first module, and carries out the authentication processing by using the second data and the third data by the second module.

The authentication method of the present invention in this case preferably generates the third data at random.

Preferably, the second module runs software programmed with the process of the authentication processing therein to carry out the authentication processing.

Alternatively, the authentication processing is processing difficult to analyze in real time using software.

Alternatively, the authentication method of the present invention authenticates the legitimacy of the user of the first module by comparing the result of the processing of the first module and the result of the processing of the second module.

Preferably, the first data and the second data are PINs of the user of the first module.

Preferably the first module is an IC card.

According to a second aspect of the present invention, there is provided an authentication system for authenticating a legitimacy of a user of a first module by using a portable first module and a second module capable of communicating with the first module, wherein the first module has an electronic circuit having a hardware configuration corresponding to predetermined authentication processing and carries out the authentication processing by using first data input to the first module at the electronic circuit and wherein the second module carries out the authentication processing by using second data corresponding to the first module and compares the result of the processing of the first module and the result of the processing of the second module to authenticate the legitimacy of the user of the first module.

According to a third aspect of the present invention, there is provided a semiconductor circuit installed in a portable module and used for authenticating the legitimacy of a user of the module, having at least an inputting/outputting means for inputting authentication data and outputting an authentication processing result and an authentication processing circuit having an electronic circuit having a hardware configuration corresponding to predetermined authentication processing and carrying out the authentication processing at the electronic circuit by using the input authentication data to generate the authentication processing result.

Preferably the inputting/outputting means receives as input predetermined data from the authentication apparatus, and the authentication processing circuit carries out the authentication processing by further using the data input by the inputting/outputting means from the authentication apparatus.

According to a fourth aspect of the present invention, there is provided a portable authentication module built in with a semiconductor circuit used for authenticating the legitimacy of a user, wherein the semiconductor circuit has at least an inputting/outputting means for inputting authentication data and outputting an authentication processing result and an authentication processing circuit having an electronic circuit having a hardware configuration corresponding to predetermined authentication processing and carrying out the authentication processing at the electronic circuit by using the input authentication data to generate the authentication processing result.

In the present invention, the electronic circuit of the first module and the semiconductor circuit used are made ones having a hardware configuration corresponding to predetermined difficult to copy authentication processing, but no authentication software is used, so easy copying of the first module and the authentication module built in with the circuit and illegitimate usage of the same can be avoided.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, an explanation will be made of a communication system according to an embodiment of the present invention.

Figure 1:
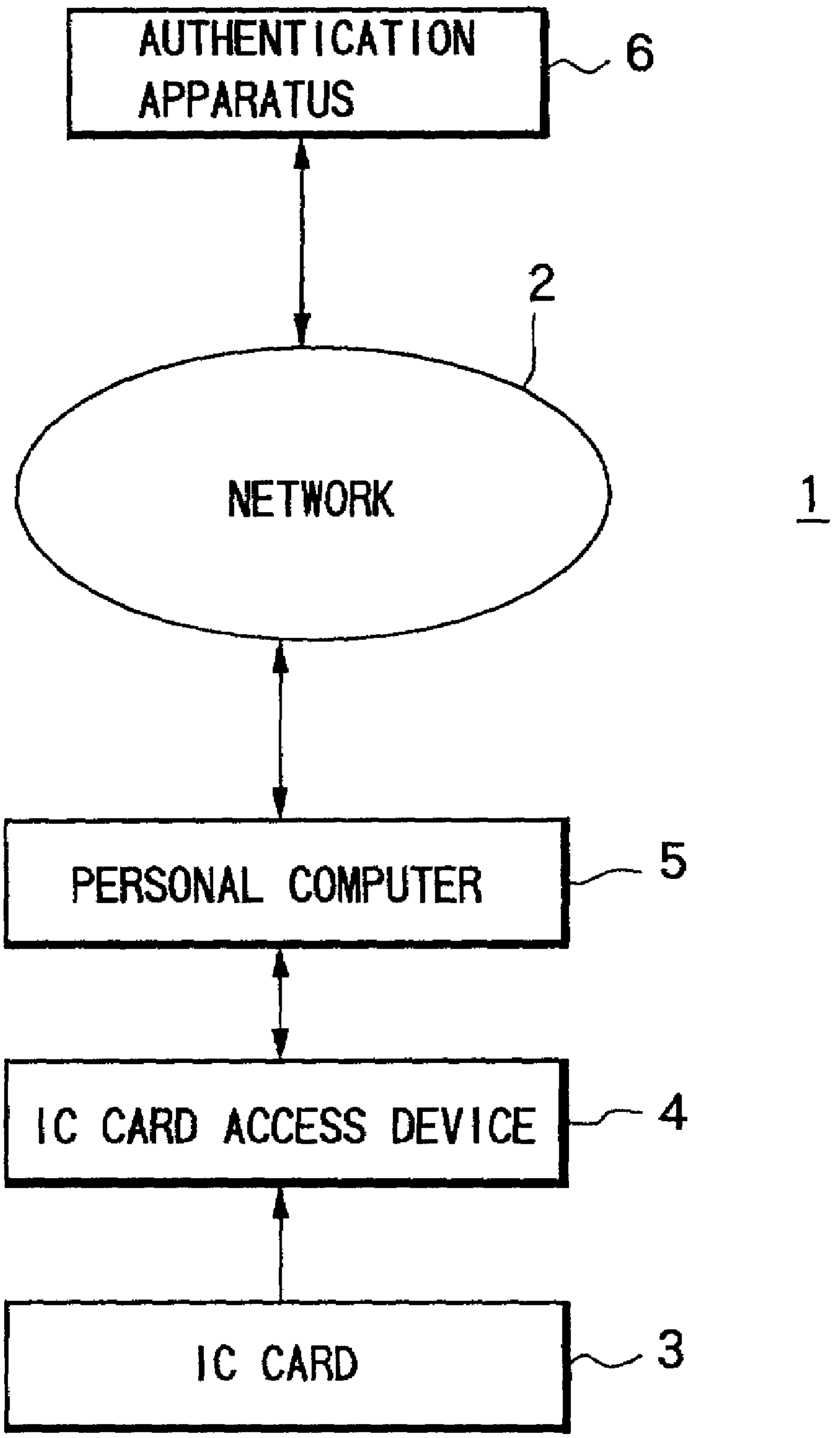
FIG. 1 is a view of the overall configuration of a communication system of an embodiment of the present invention.

FIG. 1 is a view of the overall configuration of a communication system 1 of the present embodiment.

As shown in FIG. 1, the communication system 1 is connected to a computer 5 and an authentication apparatus 6 via a network 2.

The computer 5 is connected to an IC card access device 4 for the input/output of information with an IC installed in the IC card 3.

Note that, in the present embodiment, the communication system 1 corresponds to the authentication system of the present invention, the IC card 3 corresponds to the authentication module and first module of the present invention, and the IC (IC 10) installed in the IC card 3 corresponds to the electronic circuit and semiconductor circuit of the present invention. Also, the authentication apparatus 6 corresponds to the second module of the present invention.

Below, a detailed explanation will be made of the elements of the communication system 1.

IC Card 3

Figure 2:
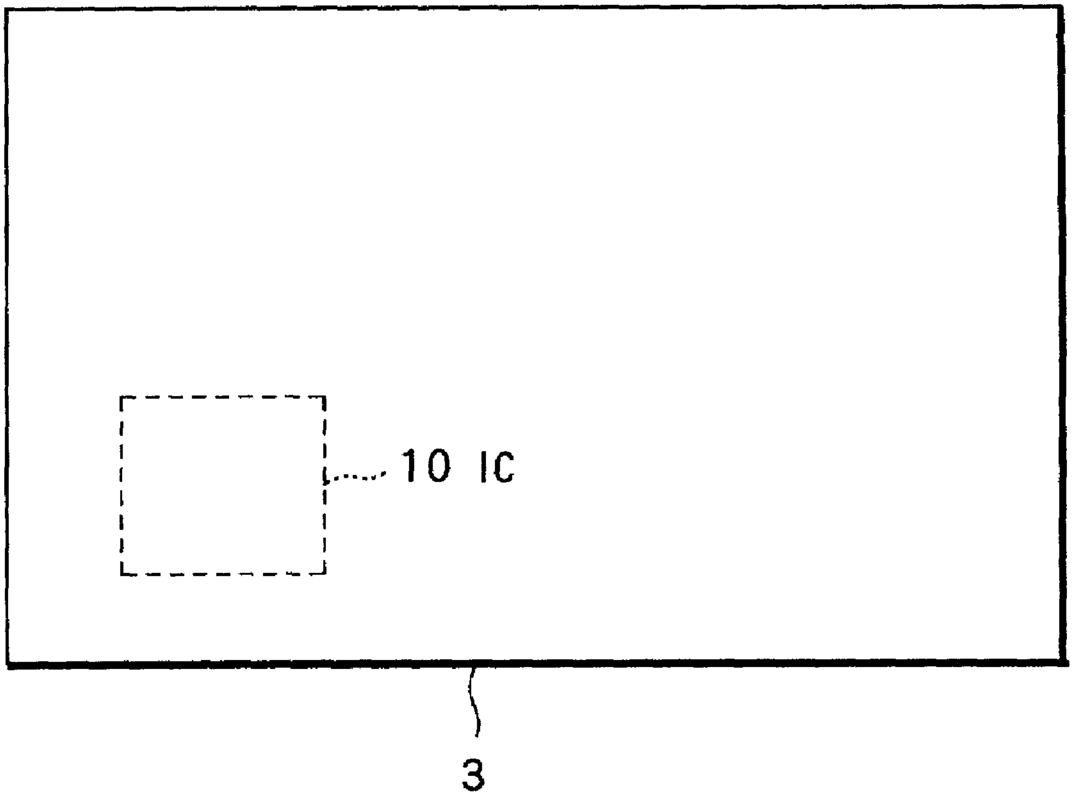
FIG. 2 is a view for explaining the configuration of an IC card shown in FIG. 1.

FIG. 2 is a view for explaining the configuration of the IC card 3.

As shown in FIG. 2, the IC card 3 has portability, forms a rectangular thin plate like shape using a plastic or the like as the material, and has the IC 10 built into it.

Note that, in the present invention, the shape of the IC card 3 is not limited to the rectangular thin plate like shape and may be for example a stick like, ball like, or button like shape too.

Figure 3:
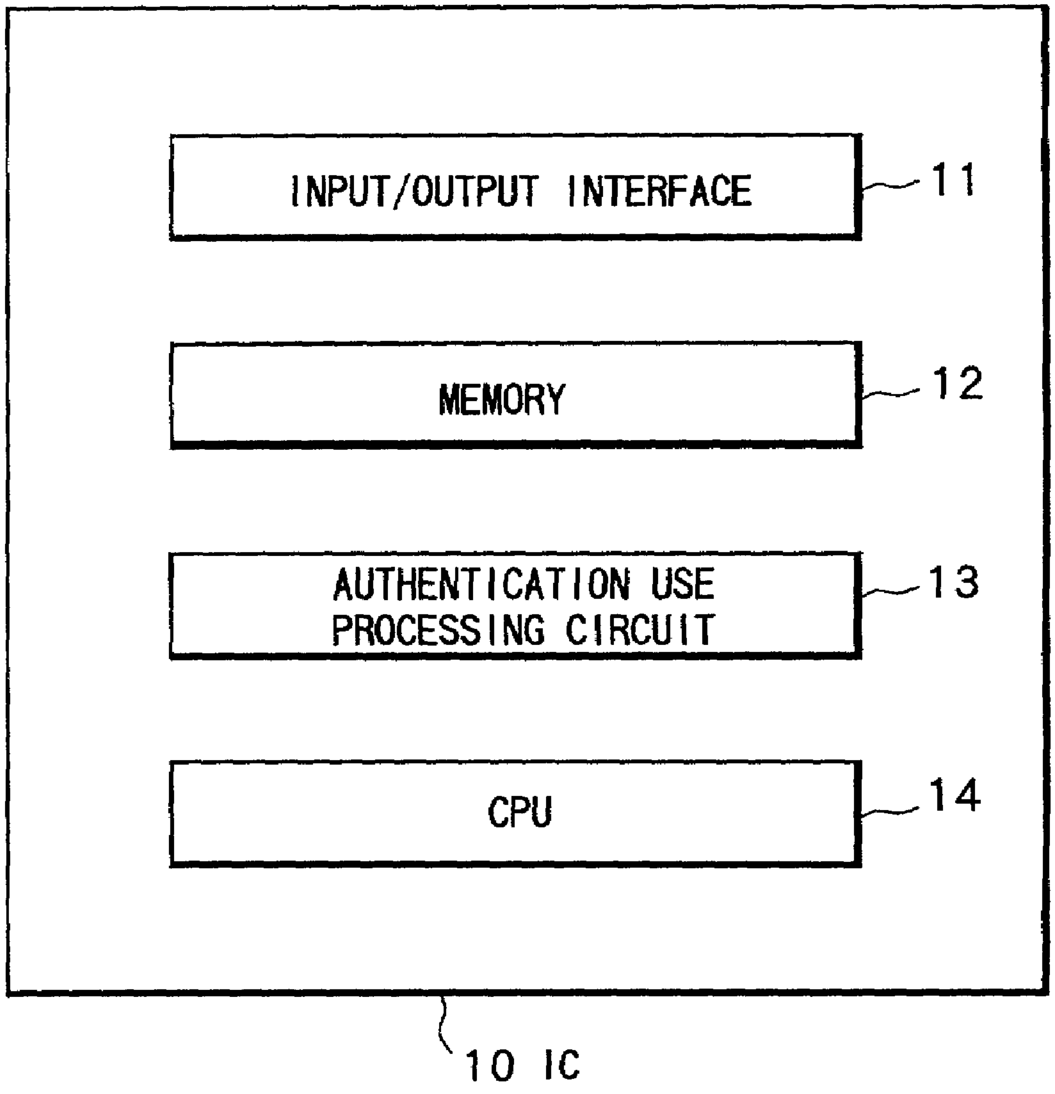
FIG. 3 is a functional block diagram of the IC shown in FIG. 2.

FIG. 3 is a functional block diagram of the IC 10 shown in FIG. 2.

As shown in FIG. 3, the IC 10 has an input/output interface 11, memory 12, authentication processing circuit 13, and central processing unit (CPU) 14.

The input/output interface 11 carries out the input/output of a request and information between the memory 12, authentication processing circuit 13, and CPU 14 and the computer 5 when the IC card 3 is connected to the IC card access device 4.

The memory 12 stores personal information of the user of the IC card 3 and predetermined information required for the processings of the authentication processing circuit 13 and the CPU 14.

The authentication processing circuit 13 is a dedicated circuit for carrying out such processing difficult to analyze in real time when analyzing the data by using software. The circuit (hardware) is comprised so that different processing results are obtained where the same input is given in relation with an authentication processing circuit of another IC card. The IC 10 as a whole or the authentication processing circuit 13 is produced by one chip by using for example an electron beam direct writing system.

Also, in the authentication processing circuit 13, in the case of, for example, a chaos circuit, the circuit is comprised so as to generate different processing results when at least one of an initial value and a number of occurrences used when carrying out the predetermined processing by using the chaos circuit is different.

In the present embodiment, by realizing the authentication processing circuit 13 not by software, but by hardware, copying of the IC card 3 substantially becomes impossible, so illegitimate usage by utilizing the IC card 3 can be effectively suppressed.

The authentication processing circuit 13 for example receives as input a PIN "x" (first data of the present invention) from the input/output interface 11 in accordance with the operation of the IC card access device 4 by the user.

Also, the authentication processing circuit 13 receives as input a parameter "a" (third data of the present invention) from the authentication apparatus 6 via the network 2, computer 5, IC card access device 4, and the input/output interface 11.

Then, the authentication processing circuit 13 carries out processing such as logistic mapping defined by the following Equation (1) by using the input PIN "x" as the initial value, and the input parameter "a" as the number of occurrences.

$$X(n+1)=4\times X(n)(1-X(n)) \tag{1}$$

Figure 4:
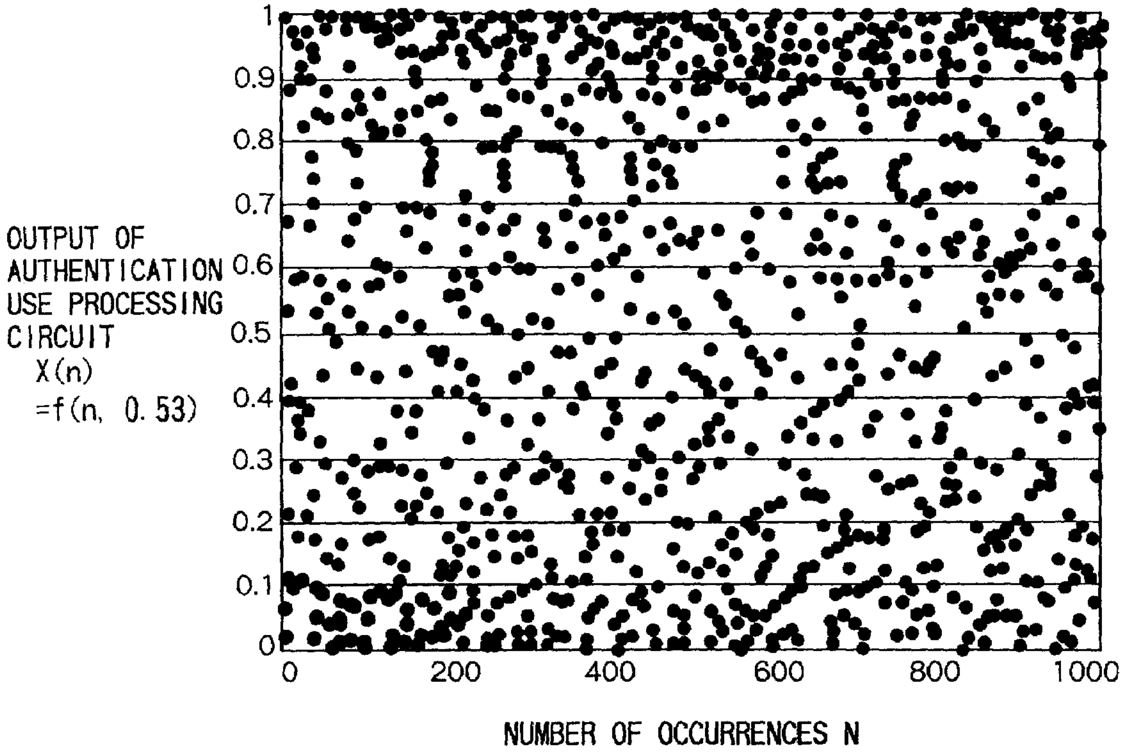
FIG. 4 is a view of a processing result X(n) when an initial value X(0)=0.53 in Equation (1), in which an abscissa indicates n, and an ordinate indicates X(n)

In the above equation (1), the processing result X(n) when the initial value X(0)=0.53 is shown in FIG. 4. In FIG. 4, the abscissa indicates n, and the ordinate indicates X(n). As shown in FIG. 4, in the above (1), X(n) appears to have pseudo random numbers within a range of 0 to 1.

Below, in the authentication processing circuit 13, the processing result X(a) when the initial value is "x" and the number of occurrences is "a" is described as a processing result f(x,a).

Figure 5:
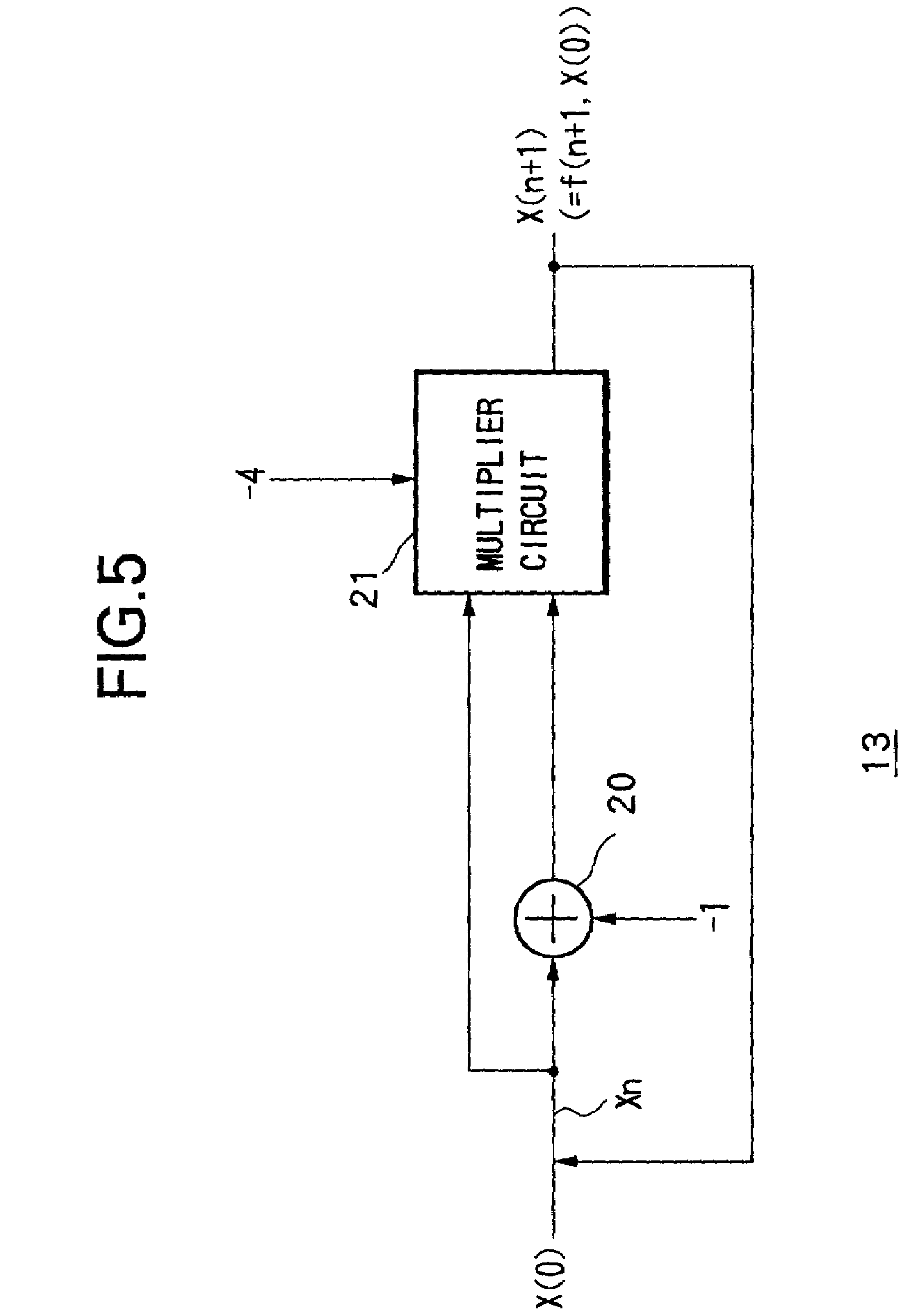
FIG. 5 is a view of an example of the configuration of an authentication processing circuit shown in FIG. 3.

FIG. 5 is a view of an example of the configuration of the authentication processing circuit 13.

As shown in FIG. 5, the authentication processing circuit 13 has an adder circuit 20 and a multiplier circuit 21.

The adder circuit 20 outputs an addition result "X(0)−1" obtained by adding the initial value X(0) and "−1" to the multiplier circuit 21 at the first processing.

Also, the adder circuit 20 outputs an addition result "X(n)−1" obtained by adding the processing result X(n) and "−1" to the multiplier circuit 21 at the (n+1)st processing.

The multiplier circuit 21 outputs a processing result "−4X(0)(X(0)−1)" obtained by multiplying "−4", an initial value X(0), and the addition result "X(0)−1" from the adder circuit 20 as the processing result X(1) at the first processing.

Also, the multiplier circuit 21 outputs a processing result "−4X(n)(X(n)−1)" obtained by multiplying "−4", the processing result X(n), and the addition result "X(n)−1" from the adder circuit 20 as the processing result X(n+1) at the (n+1)st processing.

The CPU 14 centrally manages the communication between the IC 10 and the IC card access device 4, the communication between the IC 10 and the computer 5 via the IC card access device 4, the communication with the authentication apparatus 6 via the network 2, computer 5, and IC card access device 4, and the processings of the input/output interface 11, memory 12, and authentication processing circuit 13.

IC Card Access Device 4

The IC card access device 4 detachably mounts the IC card 3 in for example a predetermined accommodation space and, in the state where the IC card 3 is mounted, carries out the input/output of the information and requests by a contact method with the IC 10 of the IC card 3.

Note that, it is also possible if the IC card access device 4 carries out the input/output of the information and requests by a noncontact method with the IC 10 of the IC card 3.

Computer 5

The computer 5 is connected to the network 2 and the IC card access device 4 and used for carrying out for example electronic commercial transactions with a not illustrated server connected on the network 2.

Authentication Apparatus 6

Figure 6:
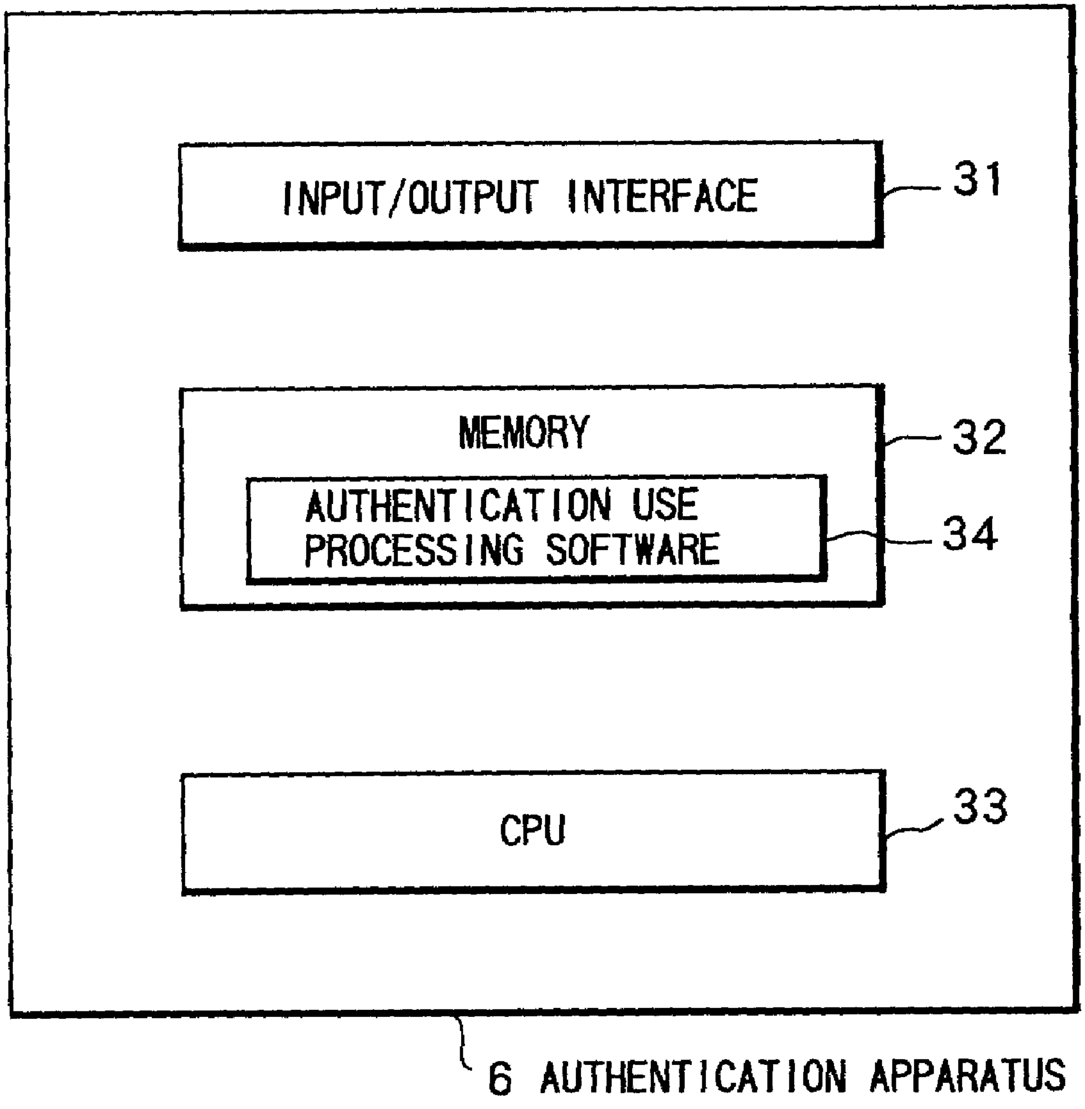
FIG. 6 is a functional block diagram of an authentication apparatus shown in FIG. 1.

FIG. 6 is a functional block diagram of the authentication apparatus 6 shown in FIG. 1.

As shown in FIG. 6, the authentication apparatus 6 has an input/output interface 31, a memory 32, and a CPU 33.

The input/output interface 31 transfers requests and information with the computer 5 and the IC card 3 shown in FIG. 1 via the network 2.

The memory 32 stores personal information of the user of the IC card 3, authentication processing software (program) 34 for carrying out the processing corresponding to the processing of the authentication processing circuit 13 shown in FIG. 3, and predetermined information required for the processing of the CPU 14.

The authentication processing software 34 is software programmed with processing the same as the processing carried out by the authentication processing circuit 13 of the IC 10 of the IC card 3 shown in FIG. 3 mentioned above.

Namely, the authentication processing software 34 is software for carrying out the processing defined by the above Equation (1) by using the PIN "x" of the user read out from the memory 32 (second data of the present invention) as the initial value and the parameter "a" obtained by generating for example random numbers at the CPU 33 as the number of occurrences.

The CPU 33 centrally manages the processings of the input/output interface 31 and the memory 32 and, at the same time, runs the authentication processing software 34 read out from the memory 32 to carry out the processing defined by the above equation (1).

Here, the processing result X(a) when the authentication processing software 34 is run at the CPU 33 by defining the initial value as "x" and defining the number of occurrences as "a" is described as the processing result f'(x,a).

The CPU 33 compares the processing result f(x,a) received from the IC card 3 and the processing result f'(x,a) generated in the CPU 33, decides that the legitimate user is using the IC card 3 when they coincide, and transmits the authentication result indicating this together with the predetermined signature information to for example the computer 5.

Below, an explanation will be made of an example of processing of the communication system 1 shown in FIG. 1.

Figure 7:
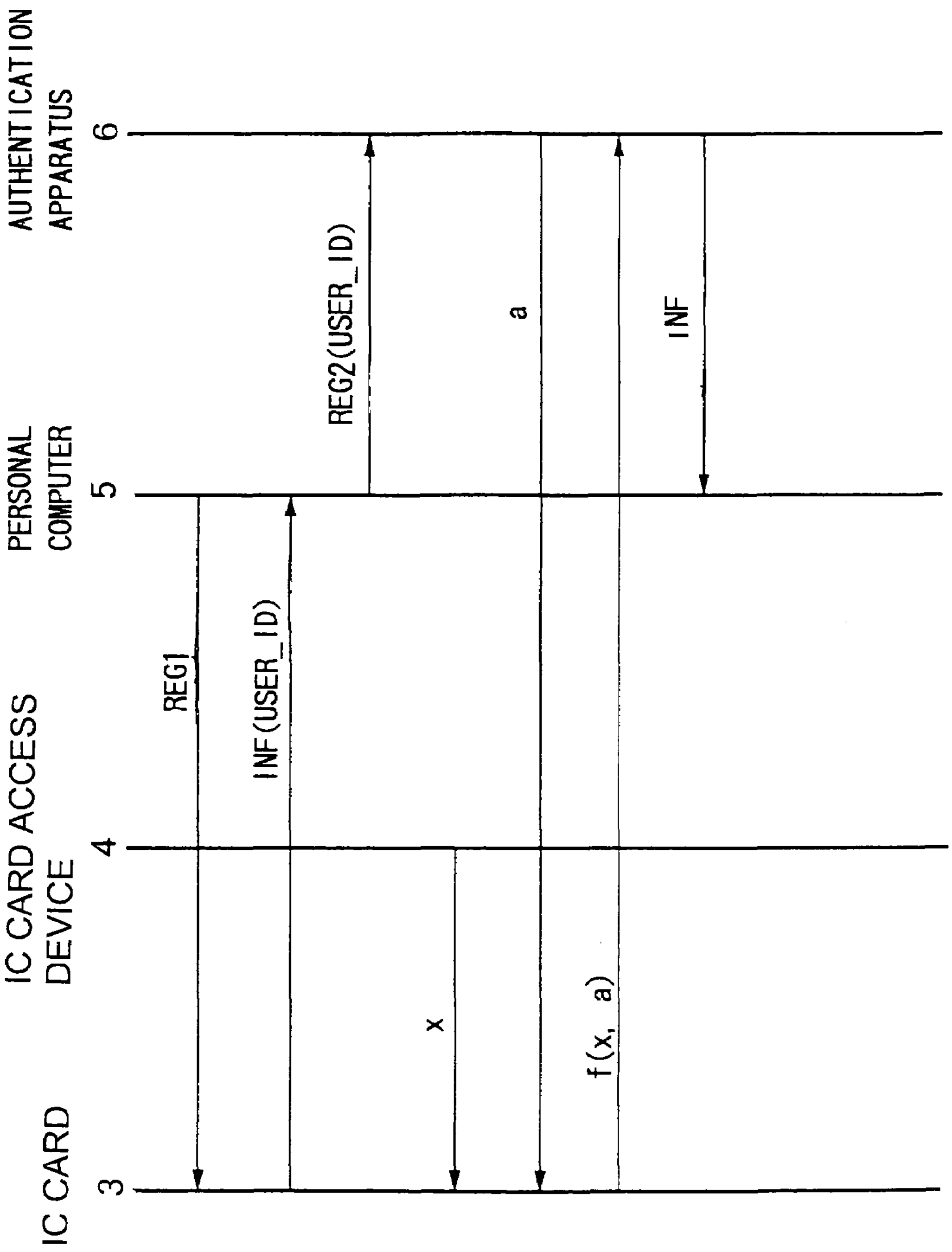
FIG. 7 is a view for explaining the flow of the signal in the example of processing of the communication system shown in FIG. 1.

FIG. 7 is a view for explaining the flow of the signal in the example of processing.

Step ST1: The computer 5 transmits an authentication request REG1 to the IC 10 of the IC card 3 via the IC card access device 4.

Step ST2: When receiving the authentication request REG1, the IC 10 reads out the user ID "USER $_{13}$ ID" of the owner of the IC card 3 from the memory 12 shown in FIG. 3 and transmits this to the computer 5.

Step ST3: The computer 5 transmits an authentication request REG2 together with the "USER $_{13}$ ID" received at step ST2 to the authentication apparatus 6.

Step ST4: The user inputs his own PIN "x" by operating a keyboard or the like of the IC card access device 4. The IC card access device 4 transmits the PIN "x" to the authentication processing circuit 13 of the IC 10 shown in FIG. 3.

Step ST5: The authentication apparatus 6 transmits the parameter "a" obtained by generating random numbers at the CPU 33 shown in FIG. 6 to the IC 10 of the IC card 3.

Step ST6: The IC 10 of the IC card 3 carries out the processing of the above Equation (1) at the authentication processing circuit 13 shown in FIG. 3 by using the PIN "x" input at step ST4 as the initial value and using the parameter "a" input at step ST5 as the number of occurrences and transmits the processing result f(x,a) thereof to the authentication apparatus 6.

Step ST7: The authentication apparatus 6 runs the authentication processing software 34 read out from the memory 32 shown in FIG. 6 at the CPU 33, carries out the processing of the above Equation (1) by using the PIN "x" corresponding to the user ID read out from the memory 32 shown in FIG. 6 and the parameter "a" obtained at step ST5, and generates the processing result f'(x,a) thereof.

Next, the authentication apparatus 6 compares the generated processing result f'(x,a) and the processing result f(x,a) received from the IC card 3 at step ST6.

Then, the authentication apparatus 6 generates an authentication result indicating that the user is legitimate when deciding that they coincide as a result of the comparison, while generates an authentication result indicating that the user is illegitimate when deciding that they do not coincide.

The authentication apparatus 6 generates an authentication reply INF storing the authentication result and the signature information of the authentication apparatus 6 therein and transmits this to the computer 5.

The computer 5 confirms the signature information contained in the authentication reply and, at the same time, carries out the predetermined processing based on the authentication result.

Here, the predetermined processing to be carried out by the computer 5 includes for example the processing connected with electronic commercial transactions such as on-line shopping carried out with another server.

Also, when the computer 5 is an ATM provided in a financial institution or the like, the predetermined processing carried out by the computer 5 is for example processing of a financial transaction requiring the personal authentication of the user.

Note that, in the example of processing mentioned above, the case where the correct PIN "x" was processed for authentication at step ST4 and, at the same time, the processing was carried out by using the common parameter "a" between the authentication apparatus 6 and the authentication processing circuit 13 of the IC card 3 was exemplified, but when the correct PIN "x" is not input at step ST4 or different parameters are used between the authentication apparatus 6 and the authentication processing circuit 13 of the IC card 3, the authentication apparatus 6 decides at step ST7 that the processing result of the authentication processing circuit 13 and the processing result of the authentication apparatus 6 do not coincide and indicates that the user of the IC card 3 is an illegitimate user.

As explained above, according to the communication system 1, the authentication processing circuit 13 of the IC card 3 shown in FIG. 3 is not realized by software, but realized by hardware. Further, a unique circuit configuration is provided for each IC card 3, so illegitimate copying of the IC card 3 can be effectively suppressed in comparison with the conventional system.

As a result, according to the communication system 1, the reliability of personal authentication using the IC card 3 can be raised, and it becomes possible to safely carry out electronic commercial transactions.

The present invention is not limited to the above embodiment.

For example, the present invention is effective even when used for preventing illegal copying of software.

For example, when the utilization of application software stored in a computer 5 such as a personal computer is limited to a person having a predetermined authorization, for example, it is also possible if the user carries out the personal authentication by using his own IC card 3 and the usage of the application software is permitted only when it is confirmed that he has the legitimate authorization.

Also, in order to permit the usage of application software by only a user having the legitimate authorization, it is also possible to prepare a plurality of IC cards 3 having the authentication processing circuits 13 having configurations individually corresponding to a plurality of application software and impart the same function as that of the authentication apparatus 6 of the embodiment mentioned above to each application software.

Also, by permitting the copying of the application software only after confirming that the user has the above authorization by using the IC card 3, the illegitimate copying of application software can be prevented.

Note that, in the present embodiment, for example, the application software is downloaded on the computer 5 via the network 2, and the IC card 3 is acquired by the user by means such as purchase at a store, mail order, or Internet order.

Also, in the above embodiment, the case where the parameter "a" used for authentication was generated at the authentication apparatus 6 was exemplified, but it is also possible to generate the parameter "a" by the IC 10 of the IC card 3 or other apparatus connected to the network 2.

Also, in the above embodiment, the chaos processing shown in the above Equation (1) was exemplified as the authentication processing of the present invention by the authentication processing circuit 13, but the authentication processing carried out by the authentication processing circuit 13 is not particularly limited so far as it is processing difficult to analyze in real time when the analysis is carried out by using software.

Summarizing the effects of the invention, as explained above, according to the present invention, an authentication method, an authentication system, a semiconductor circuit, and an authentication module capable of avoiding easy copying of a module used for personal authentication and raising the reliability of personal authentication can be provided.

While the invention has been described with reference to specific embodiments chosen for purpose of illustration, it should be apparent that numerous modifications could be made thereto by those skilled in the art without departing from the basic concept and scope of the invention.

What is claimed is:

1. An authentication method for authenticating a legitimacy of a user of a first module by using a portable first module and a second module capable of communicating with said first module, comprising the steps of:

carrying out authentication processing by using first data input to said first module at an electronic circuit having a hardware configuration corresponding to predetermined authentication processing provided in said first module;

carrying out said authentication processing by using second data corresponding to said first module having said second module;

comparing a result of said processing of said first module with the result of said processing of said second module to authenticate the legitimacy of the user of said first module, wherein the electronic circuit performs a calculation in carrying out said authentication processing, is realized by hardware, rather than software, and has a unique circuit configuration provided for each said first module;

generating third data by one module between said first module and said second module;

transmitting said generated third data from said one module to the other module;

carrying out said authentication processing by using said first data and said third data by said first module; and carrying out said authentication processing by using said second data and said third data by said second module, wherein the calculation performed by the electronic circuit in carrying out said authentication processing comprises a function that defines a logistic mapping based upon said first data and said third data.

2. The authentication method of claim 1, wherein the electronic circuit comprises a multiplier circuit and an adder circuit that calculate results of the function that defines the logistic mapping based upon the first data and the third data.

3. An authentication method as set forth in claim 1, wherein, when said first data and said second data coincide, the result of said processing of said first module and the result of said processing of said second module coincide to authenticate the legitimacy of the user of the first module.

4. An authentication method as set forth in claim 1, wherein said third data is generated at random.

5. An authentication method as set forth in claim 1, wherein said second module carries out said authentication processing by running a software programmed with the process of said authentication processing.

6. An authentication method as set forth in claim 1, wherein said authentication processing is processing difficult to analyze in real time by using software.

7. An authentication method as set forth in claim 1, which authenticates the legitimacy of the user of said first module by comparing the result of said processing of said first module and the result of said processing of said module.

8. An authentication system as set forth in claim 1, wherein said first data and said second data are PINs of the user of said first module.

9. An authentication method as set forth in claim 1, wherein said first module is an IC card.

10. An authentication system for authenticating a legitimacy of a user of a first module by using a portable first module and second module capable of communicating with said first module, wherein said first module has an electronic circuit having a hardware configuration corresponding to predetermined authentication processing and carries out said authentication processing by using first data imput to the first module at the electronic circuit, said second module carries out said authentication processing of second data corresponding to said first module and compares the result of said processing of said first module and the result of said processing of said second module to authenticate the legitimacy of the user of said first module, wherein the electronic circuit performs a calculation in carrying out said authentication processing, is realized by hardware, rather than software, and a unique circuit configuration provided for each said first module, one module between said first module and said second module generates third data and transmits the generated third data from said one module to the other module, said first module carries out said authentication processing by using said first data and said third data, and said second module carries out said authentication processing by using said second data and said third data, wherein the calculation performed by the electronic circuit in carrying out said authentication processing comprises a function that defines a logistic mapping based upon said first data and said third data.

11. The authentication system of claim 10, wherein the electronic circuit comprises a multiplier circuit and an adder circuit that calculate results of the function that defines the logistic mapping based upon the first data and the third data.

12. An authentication system as set forth in claim 10, wherein said second module authenticates that the result of said processing of said first module and the result of said processing of said second module coincide and the user of said first module is a legitimate person when said first data and said second data coincide.

13. An authentication system as set forth in claim 10, which generates said third data at random.

14. An authentication system as set forth in claim 10, wherein said first data and said second data are PINs of the user of said first module.

15. A semiconductor circuit built into a portable module and used for authenticating the legitimacy of a user of said module, comprising:

an inputting/outputting means for inputting an authentication data from a user, inputting an input parameter received from an authentication apparatus, and outputting an authentication processing result; and an authentication processing circuit having an electronic circuit having a hardware configuration corresponding to predetermined authentication processing and carrying out said authentication processing at the electronic circuit by using said authentication data to generate said authentication processing result, wherein the electronic circuit performs a calculation in carrying out said authentication processing, is realized by hardware, rather than software, and has a unique circuit configuration provided for each said first module, wherein the calculation performed by the electronic circuit in carrying out said authentication processing comprises a function that defines a logistic mapping based upon said authentication data and said input parameter received from the authentication apparatus.

16. The semiconductor circuit of claim 15, wherein the electronic circuit comprises a multiplier circuit and an adder circuit that calculate results of the function that defines the logistic mapping based upon the first data and the third data.

17. A semiconductor circuit as set forth in claim 15, wherein said inputting/outputting means inputs a PIN of the user of the module as said authentication data.

18. A portable authentication module built in with a semiconductor circuit used for authenticating the legitimacy of a user, wherein said semiconductor circuit has at least an inputting/outputting means for inputting an authentication data from a user, inputting an input parameter received from an authentication apparatus, and outputting an authentication processing result; and an authentication processing circuit having an electronic circuit having a hardware configuration corresponding to predetermined authentication processing and carrying out said authentication processing at the electronic circuit by using said authentication data to generate said authentication processing result, wherein the electronic circuit performs a calculation in carrying out said authentication processing, is realized by hardware, rather than software, and has a unique circuit configuration provided for each said first module, wherein the calculation performed by the electronic circuit in carrying out said authentication processing comprises a function that defines a logistic mapping based upon said authentication data and said input parameter received from the authentication apparatus.

19. The portable authentication module of claim 18, wherein the electronic circuit comprises a multiplier circuit and an adder circuit that calculate results of the function that defines the logistic mapping based upon the first data and the third data.

20. An authentication method for authenticating a legitimacy of a user of a first module by using a portable first module and a second module capable of communicating with said first module, comprising the steps of:

carrying out authentication processing by using first data input to said first module at an electronic circuit having a hardware configuration corresponding to predetermined authentication processing provided in said first module, wherein the electronic circuit performs a calculation in carrying out said authentication processing and has a unique circuit configuration provided for each said first module;

carrying out said authentication processing by using second data corresponding to said first module having said second module; and comparing a result of said processing of said first module with the result of said processing of said second module to authenticate the legitimacy of the user of said first module, and further comprising the steps of:

generating third data by one module between said first module and said second module;

transmitting said generated third data from said one module to the other module;

carrying out said authentication processing by using said first data and said third data by said first module; and carrying out said authentication processing by using said second data and said third data by said second module, wherein the calculation performed by the electronic circuit in carrying out said authentication processing comprises a function that defines a logistic mapping based upon said first data and said third data.

21. The authentication method of claim 20, wherein the electronic circuit comprises a multiplier circuit and an adder circuit that calculate results of the function that defines the logistic mapping based upon the first data and the third data.

22. An authentication method as set forth in claim 20, wherein said third data is generated at random.

23. An authentication method as set forth in claim 20, wherein said third data is generated at random.

24. A portable first module and a second module capable of communicating with said first module, wherein said first module has an electronic circuit having a hardware configuration corresponding to predetermined authentication processing and carries out said authentication processing by using first data input to the first module at the electronic circuit, and said second module carries out said authentication processing by using second data corresponding to said first module and compares the result of said processing of said first module and the result of said processing of said second module to authenticate the legitimacy of the user of said first module, wherein;

one module between said first module and said second module generates third data and transmits the generated third data from said one module to the other module, said first module carries out said authentication processing by using said first data and said third data, said second module carries out said authentication processing by using said second data and said third data, and said electronic circuit performs a calculation in carrying out said authentication processing and has a unique circuit configuration provided for each said first module, wherein the calculation performed by the electronic circuit in carrying out said authentication processing comprises a function that defines a logistic mapping based upon said first data and said third data.

* * * * *

UNITED STATES PATENT AND TRADEMARK OFFICE

CERTIFICATE OF CORRECTION

PATENT NO. : 7,131,002 B2
APPLICATION NO. : 09/948552
DATED : October 31, 2006
INVENTOR(S) : Masaki Yoshizawa et al.

It is certified that error appears in the above-identified patent and that said Letters Patent is hereby corrected as shown below:

Column 9:
Lines 24-25, “processing of second data” should read -- processing by using second data --.

Column 23:
Lines 21 and 22, (claim 23) should be deleted in their entirety.
Line 23, “24” should read -- 23 --.

Signed and Sealed this

Eighteenth Day of March, 2008

JON W. DUDAS
*Director of the United States Patent and Trademark Office*